(12) United States Patent
Lyness

(10) Patent No.: US 6,496,842 B1
(45) Date of Patent: Dec. 17, 2002

(54) NAVIGATING HEIRARCHICALLY ORGANIZED INFORMATION

(75) Inventor: Stanley W. Lyness, Sharon, MA (US)

(73) Assignee: Survol Interactive Technologies, Sharon, MA (US)

(*) Notice: Subject to any disclaimer, the term of this patent is extended or adjusted under 35 U.S.C. 154(b) by 0 days.

(21) Appl. No.: 09/322,720

(22) Filed: May 28, 1999

(51) Int. Cl.[7] .............................................. G06F 15/00
(52) U.S. Cl. ..................... 707/514; 707/907; 345/851; 345/854
(58) Field of Search ................ 707/514, 907; 345/356, 357, 848–854

(56) References Cited

U.S. PATENT DOCUMENTS

| | | | | |
|---|---|---|---|---|
| 5,230,072 A | * | 7/1993 | Smith et al. ................... 707/4 |
| 5,295,243 A | | 3/1994 | Robertson et al. .......... 345/348 |
| 5,333,254 A | | 7/1994 | Robertson .................... 345/356 |
| 5,388,196 A | * | 2/1995 | Pajak et al. .................. 345/751 |
| 5,412,776 A | * | 5/1995 | Bloomfield et al. ......... 345/783 |
| 5,444,837 A | * | 8/1995 | Bomans et al. ............. 345/440 |
| 5,546,529 A | * | 8/1996 | Bowers et al. .............. 395/159 |
| 5,555,354 A | | 9/1996 | Strasnick et al. ........... 345/427 |
| 5,590,250 A | | 12/1996 | Lamping et al. ............ 345/427 |
| 5,619,632 A | | 4/1997 | Lamping et al. ............ 345/441 |
| 5,628,011 A | * | 5/1997 | Ahamed et al. ............... 707/10 |
| 5,671,381 A | | 9/1997 | Strasnick et al. ........... 345/355 |
| 5,675,752 A | * | 10/1997 | Scott et al. .................. 345/723 |
| 5,701,137 A | * | 12/1997 | Kiernan et al. ............. 345/119 |
| 5,751,931 A | | 5/1998 | Cox et al. .................... 345/440 |
| 5,781,785 A | * | 7/1998 | Rowe et al. ................. 707/513 |
| 5,786,820 A | * | 7/1998 | Robertson ................... 345/848 |
| 5,790,121 A | * | 8/1998 | Sklar et al. .................. 345/835 |
| 5,794,039 A | * | 8/1998 | Guck ............................. 707/4 |
| 5,794,236 A | * | 8/1998 | Mehrle ........................... 707/5 |
| 5,801,702 A | * | 9/1998 | Dolan et al. ................ 345/357 |
| 5,802,526 A | * | 9/1998 | Fawcett et al. .......... 348/14.06 |

(List continued on next page.)

OTHER PUBLICATIONS

Koike et al., Fractal approaches for visualizing huge hierarchies, Aug. 1993, Visual Language, IEEE, pp. 55–60.*

Harrison et al., Presentation by tree transformation, Feb. 1997, Compcon '97, IEEE, pp. 68–73.*

Ward et al., Navigating hierarchies with structure–based brushes, Oct. 1999, Information Visualization, IEEE, pp. 58–64, 146.*

Holmquist, Lars Erik, "Focus+Context Visualization with Flip Zooming and the Zoom Browser", CHI 97 Electronic Publications: Late–Breaking/Interactive Posters, ACM Press 1997.

Holmquist, Lars Erik, "A Hierarchical Focus+Context Method for Image Browsing", 1998.

Preim, Bernhard et al., "Coherent Zooming of Illustrations with 3D–Graphics and Text", 1997.

Ratner et al., "A Zooming Web Browser—To Appear in Human Factors in Web Development", 1998.

Koike, H. et al., "Fractal Approaches for Visualizing Huge Hierarchies", Proceedings of the 1993 IEEE/CS Symposium on Visual Languages, Aug. 24–27, 1993, IEEE, 1993, pp. 55–60.

(List continued on next page.)

Primary Examiner—Stephen S. Hong
Assistant Examiner—Conglac Huynh
(74) Attorney, Agent, or Firm—Fish & Richardson P.C.

(57) ABSTRACT

Hierarchies are navigated easily through a user interface that is continuous in its presentation of node information and may be implemented using a small display space.

47 Claims, 13 Drawing Sheets

U.S. PATENT DOCUMENTS

| | | | | |
|---|---|---|---|---|
| 5,812,135 | A | | 9/1998 | Kotchey .................... 707/100 |
| 5,833,470 | A | * | 11/1998 | Harrison et al. ............ 434/323 |
| 5,842,218 | A | * | 11/1998 | Robinson .................... 707/102 |
| 5,844,554 | A | * | 12/1998 | Geller et al. ................ 345/333 |
| 5,850,429 | A | * | 12/1998 | Joyce et al. .................. 379/88 |
| 5,877,775 | A | | 3/1999 | Theisen et al. ............. 345/440 |
| 5,898,462 | A | * | 4/1999 | Harrison et al. ............ 348/552 |
| 5,917,492 | A | * | 6/1999 | Bereiter ...................... 345/357 |
| 6,046,742 | A | * | 4/2000 | Chari ......................... 345/734 |
| 6,078,575 | A | * | 6/2000 | Dommety et al. .......... 370/338 |
| 6,098,072 | A | * | 8/2000 | Sluiman et al. ............. 707/103 |
| 6,108,784 | A | * | 8/2000 | Seidensticker .............. 713/187 |
| 6,144,962 | A | * | 11/2000 | Weinberg et al. ............ 707/10 |
| 6,147,687 | A | * | 11/2000 | Wanderski .................. 345/853 |
| 6,204,850 | B1 | * | 3/2001 | Green ........................ 345/357 |
| 6,219,053 | B1 | * | 4/2001 | Tachibana et al. .......... 345/348 |
| 6,240,549 | B1 | * | 5/2001 | Hamada et al. ................ 717/5 |
| 6,252,597 | B1 | * | 6/2001 | Lokuge ...................... 345/353 |
| 6,279,007 | B1 | * | 8/2001 | Uppala ....................... 707/101 |
| 6,285,366 | B1 | * | 9/2001 | Ng et al. .................... 345/356 |
| 6,289,354 | B1 | * | 9/2001 | Aggarwal et al. .......... 707/104 |
| 6,348,935 | B1 | * | 2/2002 | Malacinski et al. ......... 345/853 |

OTHER PUBLICATIONS

Matsuura, Toshio et al., "A Graph Editor for Large Trees with Browsing and Zooming Capabilities", Systems and Computers in Japan, 1993, pp. 35–46.

Bright, "Graphical User Interface for Managing Complex Objects", IBM TDB, vol. 34, p. 11 (Apr. 1992), pp. 387–389.

Pope, S.T. et al., "The ParcPlace Systems Navigator Applications and Frameworks", presented at ACM SigGraph Symposium on User Interface Software, Oct. 1988, Banff, Canada, pp. 1–30 (Table of Contents Only).

Robertson, George G. et al., "Cone Trees: Animated 3D Visualizations of Hierarchical Information", Reaching Thru Technology—CHI '91 Conference Proceedings, New Orleans, LA, Apr. 27–May 2, 1991, pp. 189–194.

Lamping, John et al., "A Focus+Context Technique Based on Hyperbolic Geometry for Visualizing Large Hierarchies", CHI '95 Proceedings Papers, Palo Alto, CA.

Munzner, Tamara, "Drawing Large Graphs with H3Viewer and Sit Manager", Proceedings for the Symposium on Graph Drawings, GD '98, Montreal, Canada, Aug. 1998.

Munzner, Tamara, "Exploring Large Graphs in 3D Hyperbolic Space", IEEE Computer Graphics and Applications, vol. 18, No. 4, pp. 18–23, Jul./Aug. 1998.

Munzner, Tamara, "H3: Laying Out Large Directed Graphs in 3D Hyperbolic Space", Proceedings of the 1997 IEEE Symposium on Information Visualization, Oct. 20–21, 1997, Phoenix, AZ, pp. 2–10, 1997.

Shneiderman, "Treemaps for Space–Constrained Visualization of Hierarchies", Dec. 26, 1998, updated Jan. 29, 2002, HCIL.

Hearst et al., "Searching and Browsing Text Collections with Large Category Hierarchies", CHI 97 Electronic Publications: Late–Breaking/Short Talks, Mar. 22–27, 1997.

Holmquist et al., "The Zoom Browser: Presenting A Focus+Context View of World Wide Web Documents", Believed to be 1997.

Beaudoin et al., "Cheops: A Compact Explorer For Complex Hierarchies", 1996.

Pearson et al., "3D Tree–Mapped Universes and Data Sphere Navigation, A Method to Increase the Density of Hierarchical Information Visualization In A Finite Display Space", Dec. 5, 1993.

Hearst et al., "Cat–A–Cone: An Interactive Interface for Specifying Searches and Viewing Retrieval Results Using A Large Category Hierarchy", Proceedings of the $20^{th}$ Annual International ACM/SIGIR Conference, Philadelphia, PA, Jul., 1997.

Carriere et al., "Interacting With Huge Hierarchies: Beyond Cone Trees", Proc. Info. Vis. Symp. 1995, IEEE Press, Atlanta, 1995, pp. 74–81.

Koike, "Fractal Views: A Fractal–Based Method for Controlling Information Display", ACM 0164–0925/99/0100–0111, 1999.

Holmquist, "Focus+Context Visualization With Flip Zooming and the Zoom Browser", 1997.

* cited by examiner

NAVIGATING HEIRARCHICALLY ORGANIZED INFORMATION

BACKGROUND

This invention relates to a user interface for navigating a set of information arranged hierarchically, even a very large set.

In a typical hierarchy or "tree" of nodes, each "node" is connected to zero or more "child" nodes and to one "parent" node, except for one "root" node which has no parent.

Hierarchies are common in data processing. Often a hierarchy provides a clear way to organize a large amount of information so that a user can find a particular piece of information. Generally, a user "navigates" a tree by iteratively viewing descriptions of a selected node's neighboring nodes and selecting one of the neighbors until the sought information is found.

A user navigates the Windows file system hierarchy, for example, by iteratively viewing a directory—the file names and subdirectory names are these neighbors' "descriptions"—then selecting a neighboring directory to view, until the sought file is found. Windows offers multiple user interfaces for the viewing/selection process: a file-selection dialog in applications; successive directory views starting with "My Computer"; a "tree view" in Windows Explorer; and even a command line shell which permits displaying and changing the "current" directory.

Other, richer user interfaces for presenting and navigating hierarchies have been proposed. Some, such as "cone trees", attempt to represent much of a hierarchy using 3D effects to convey relationships on a crowded display. Several use "focus+context" techniques; that is, the portion of the hierarchy upon which the user is currently focused, such as a current directory, is presented in full, and portions further from this focus are presented with progressively less detail. This can be achieved by wrapping a 2D representation of the tree about a curved surface and shading parts of the view away from the focus (these two techniques create a "fish-eye lens" effect), by fractal techniques, or by nesting boxes so that rectangles representing child nodes fill the rectangle representing the parent ("tree-maps"). Some techniques depict the nodes as objects in a 3D landscape, with more distant nodes appearing smaller.

As for navigation, a theme which is common from "tree view" to "tree-maps" is to detect user input selecting a node (as by a mouse click "on" the node) and redraw the view of the hierarchy with the selected node as the new "focus". A few user interfaces portray the change in views with an animated sequence of intermediate views to suggest an object-like persistence. Some user interfaces, e.g. the 3D landscapes, allow a mode of navigation where the hierarchy view changes continuously, suggesting flight over the landscape.

Hierarchically organized information is ubiquitous. Computer file systems, dictionaries, indexes, tables of contents, and XML documents are hierarchical. The functions available in some applications are organized hierarchically in menus. On the web, many portals and retail sites are organized hierarchically. Web sites are not constrained to be hierarchical, but, again, hierarchy is a clear way to organize large amounts of information.

SUMMARY

In general, in one aspect, the invention features identifying a hierarchy position in a space defined by a hierarchy of nodes. The space has at least two dimensions. Each node is uniquely identifiable within the space by values in the respective dimensions, including a node level identifying the node's hierarchy level and a node-in-level identifying the node uniquely among nodes in that level. The hierarchy position is identified by position values in the same dimensions. Position values need not correspond to actual node level or node-in-level values.

Implementations of the invention may include one or more of the following features.

The position values may include depth value and position-within-level values both in the form of non-integral numbers. The position-within-level value may include a node-in-level value identifying one node plus a floating-point number representing an offset of the position from that node. The hierarchy position may be used to identify a focus of a user's view of the hierarchy.

In general, in another aspect, the invention features displaying representations of nodes of a hierarchy in a space on a display, each node representation fully occupying a subspace within the space, and allocating the space entirely to the subspaces.

Implementations of the invention may include one or more of the following features. The nodes are organized in levels in the hierarchy and the space is allocated among the levels so that one level is fully represented in a dimension of the display that corresponds to changing levels. The levels of the hierarchy above and below the one level are at least partially represented. Each of the levels is represented as a band in the space. Nodes represented in one band have a parent-child relationship with nodes represented in an adjacent band. Within a band, space is allocated so that the subspace of a parent has the same dimension along the band as the sum of the dimensions of its children along the adjacent band.

In general, in another aspect, the invention features rendering a container associated with the node and a representation of information associated with the node. The container has dimensions that change with an amount of space dynamically allocated to the node based on a changing focus in the hierarchy. The representation has unchanging dimensions. The container and the representation are drawn on a display. When the focus changes, the container is re-rendered with updated dimensions and drawn on the display. Without re-rendering, the rendered representation is recopied to a new location.

In implementations of the invention, the drawn container indicates the node's position in the hierarchy and its relationship to nearby nodes, and the representation includes graphics or text or both.

In general, in another aspect, information is received indicating a displacement of a user input device within a two-dimensional frame of reference. Displacement in at least one of the dimensions is translated to a rate of change of a hierarchy position used to identify a focus of a user's view of the hierarchy.

In general, in another aspect, the invention features displaying a representation of a portion of a hierarchy of nodes to a user. Each node may have associated an action to be performed by an application, the action being other than navigation of the hierarchy. A user navigates in the displayed representation of the portion of the hierarchy by using a first type of action. The user triggers the action associated with a displayed node of the hierarchy by invoking the node using a second type of action.

In implementations of the invention, the first type of action may be dragging and the second type of action may be clicking.

In general, in another aspect of the invention an emulation of a return-to-center input device enables a user to navigate the hierarchy. The user manipulates a non-return-to-center input device to indicate an intended manipulation of the emulation for purposes of navigating the hierarchy. The user's manipulation is treated as a manipulation of the return-to-center input device.

Implementations of the invention may include one or more of the following features. The non-return-to-center input device is a computer mouse, trackball, or pad. The return-to-center input device is a joystick. The emulation includes rendering the device on a display. The response to the user manipulation is to change a focus position in the hierarchy. The focus position is changed by periodically adding a focus increment vector to a focus position, the focus increment vector being a function of the vector by which the emulated controller is displaced from its center or rest position. The user manipulates the non-return-to-center controller in a single dragging action to view an arbitrarily large hierarchy of nodes. The function is nonlinear to permit the user to vary navigation velocity over a wide two-dimensional range.

In another aspect, the invention features displaying information at a client about a portion of a hierarchy of nodes including a node at the top of a sub-hierarchy of the hierarchy. As a user's navigation causes sub-hierarchies to approach view in the displayed information, information about the sub-hierarchy that is approaching view is fetched from a server.

In another aspect, a request is received at a server from a client for a hierarchy definition. In response, the client is provided a portion but not all of the hierarchy definition, the portion referencing other portions of the hierarchy.

In implementations of the invention, the size of the portion to be provided to the client may be determined adaptively based on parameters for optimizing communication between the server and the client. The server may automatically build a hierarchy definition portion that is as near as possible in size to a given minimum portion size. The server may generate references to sub-hierarchies and include them with definitions of nodes of the portion provided.

In another aspect, a web page includes an area that provides a navigational interface to permit continuous navigation of a hierarchy of nodes of, e.g., links to other web pages.

In another aspect, a user interface includes a device that permits continuous navigation for selecting from a hierarchy.

In implementations, the hierarchy may include a function menu, a file system, an XML document, an index constructed from a document, list, or table, an encoded hierarchy, the Dewey Decimal System, categorized products, postal addresses or other location by geographic region, a character set to be selected for text entry, or a corpus which is not hierarchical in its native form and upon which hierarchy has been imposed using a similarity-seeking technology.

Among the advantages of the invention may be one or more of the following.

An indefinitely large hierarchy may be navigated. The interface permits fast navigation of the hierarchy.

The interface reduces the cognitive load to the user in at least the following ways.

The user is offered a simple metaphor of the hierarchy as a continuous plane, the view of which can only change smoothly as the user navigates. The user is spared abrupt, jarring (to novices, frightening) changes in view by allowing direct control over rate of change of focus, so that the view of the hierarchy changes smoothly over time. Any effects of such discontinuities in the view as are necessary are minimized by being split into smaller discontinuities distributed over time. The nodes in a level do not appear full blown all at once, but appear first as small outlines, with detail arriving at different times for different nodes.

The user is not burdened with separate controls for scrolling, for rotation, or for zooming—all navigation is done with one intuitive control with a simple physical metaphor. The single control functionally replaces, for instance, the four scroll buttons, two sliders, and numerous buttons labeled "+" or "−" in Windows "TreeView". The interface in this way reduces repetitive hand and eye movements as well as cognitive demands.

The relationship between parent and child nodes is made apparent to first-time users by depicting parent nodes as containing the children instead of by drawing ambiguous connecting lines.

The interface is frugal with respect to available computer display "real estate". Space is allocated extremely efficiently, freeing most of a typical computer display for other tasks.

The interface requires only a small implementation size. The algorithms for hierarchy rendering can be realized in compact code for low memory use and fast delivery over a network.

The interface is frugal with respect to hierarchy-loading bandwidth. Hierarchy information—which can be of indefinite size—is transferred in small portions on demand as the user "approaches" them. A user can navigate all levels of a huge hierarchy, acquiring a sense of its size, having caused only a small fraction of the hierarchy information to be loaded.

The interface is especially useful in "World-Wide Web" applications. Novice users distracted by advertisements have a lower capacity for new metaphors and surprising changes of view. The interface accommodates the user's expectation that web navigation is to be effected with a small "navigation frame" on the left. The code implementing the user-interface for the web is compact enough to be downloaded with a page (as an applet) which accommodates the user's resistance to installing "plug-ins". The web surfer need not wait for the information describing a huge hierarchy to be loaded over a slow network.

Each node can have a distinct text and/or graphical representation. Associated with each node can be an apparent way to execute a distinct action apart from navigation when the node is selected.

The hierarchical structure, text and/or graphical representation of each node, and action associated with each node, are defined in human readable formats. This hierarchy definition may be requested and delivered incrementally and on demand. The delivery is a special case of "streaming" data in which the data are dispersed in two dimensions and the order in which the data are required cannot be predicted with confidence.

Other advantages and features will become apparent from the following description and from the claims.

DESCRIPTION

DESCRIPTION OF THE PREFERRED EMBODIMENTS

Figure 1:
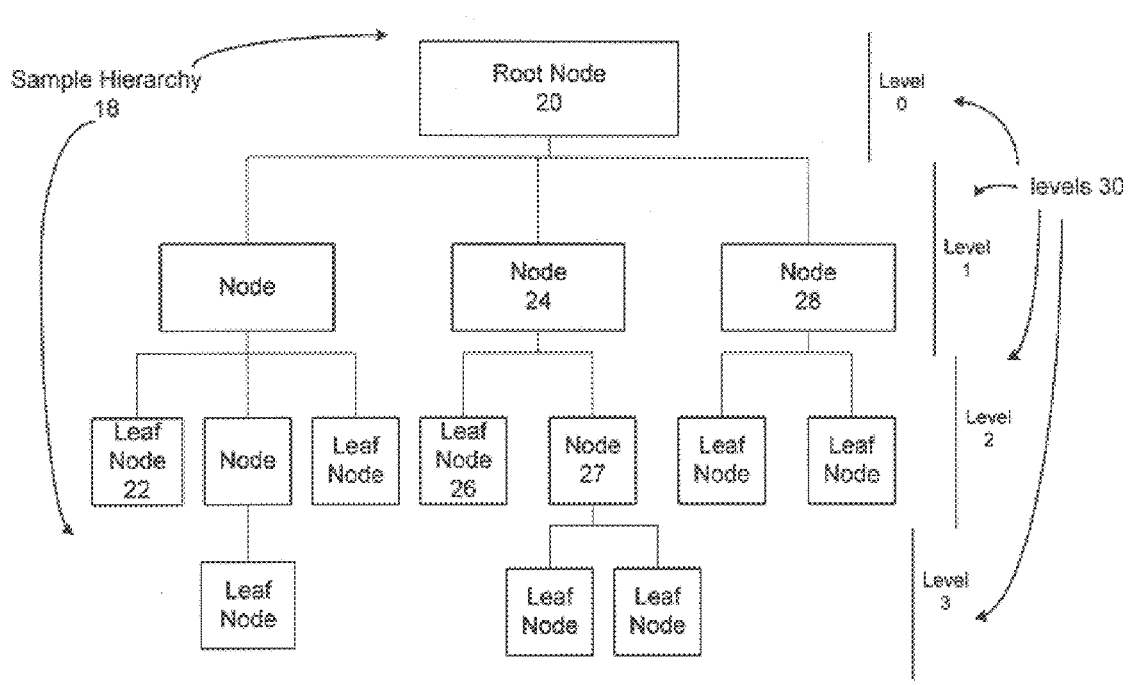
FIG. 1 illustrates relationships in a simple hierarchy.

FIG. 1 illustrates relationships that can exist among nodes comprising a hierarchy 18 and introduces some naming conventions. Each node has zero or more "child" nodes, and each node has exactly one "parent" node except for the "root" node 20 which has no parent node. For instance, node 26 is the child of node 24, which is the parent of two nodes 26, 27. It will be useful later to number children from left to right; node 26 thus has a "child index" of 0 and node 27 has a child index of 1. A node with no child nodes, like node 22, is called a "leaf" node.

Nodes can grouped by their hierarchy "level", which we define as the number of steps of descent by which they can be reached starting from the root node. There are four levels 30 in the hierarchy of FIG. 1.

Implementations of the invention present in a limited display area a view of the hierarchy that can be changed under user control. At any one time the view is "focused" or centered either at one node or between nodes, and contains all nodes surrounding this center of view or "Focus". A user may see one of these surrounding nodes and manipulate the Focus toward that node so that all nodes surrounding that node are now in view. By continued navigation of this sort, and exploiting the fact that any node in the hierarchy can be reached from any other node by a series of steps through intermediate nodes, the user may view any point in the entire hierarchy. Methods discussed below make this navigation experience "smooth"—the Focus changes gradually, and the resulting changes in the view are "animated" or rendered in many small steps.

Figure 2:
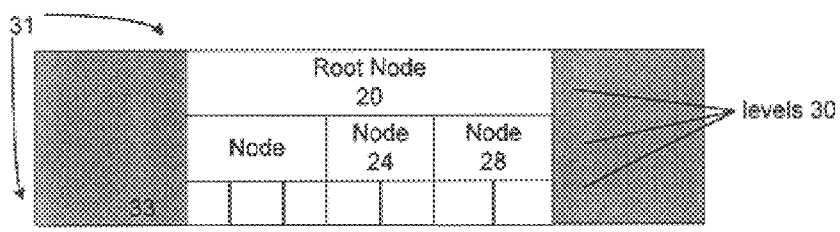
FIG. 2 illustrates an allocation of display area to a portion of the sample hierarchy, arranged in the horizontal direction.
Figure 3:
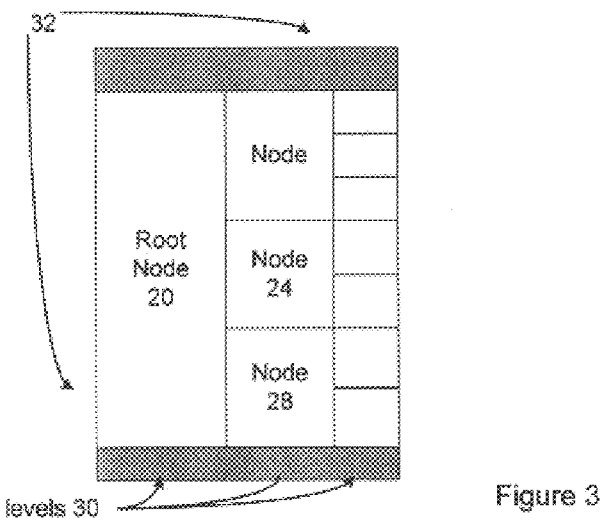
FIG. 3 illustrates an allocation of display area to a portion of the sample hierarchy, arranged in the vertical direction.

FIGS. 2 and 3 show two examples of limited display areas. FIG. 2 shows a horizontally aligned display area 31, which is efficiently apportioned to nodes about a Focus near Node 24. The Focus is an imaginary point in the hierarchy that corresponds to the point at the exact center of the display area. In this "horizontal" layout, the nodes of each of the levels 30 are arrayed horizontally. Because of the small size of this sample hierarchy, some of the display area (33, shaded) is unallocated for this particular Focus.

FIG. 3 shows a vertically aligned limited display area as might be particularly useful in web applications. Here nodes in each of the levels are arranged vertically, with the top of the hierarchy to the left of the display area.

For convenience, the rest of this description refers only to the horizontal layout depicted in FIG. 2.

Figure 4:
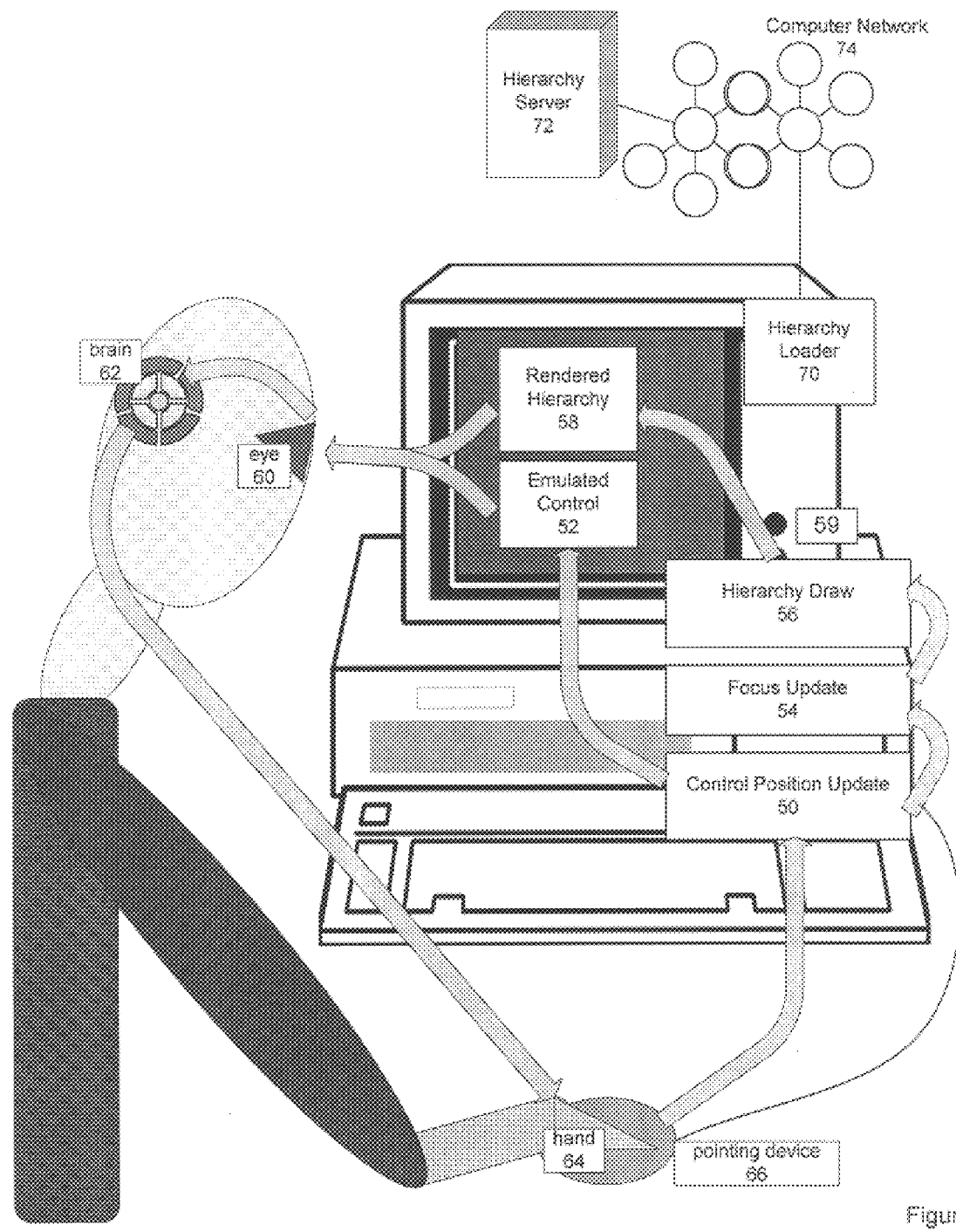
FIG. 4 shows a hierarchy view-and-control loop including the user and the invention in a computer network context.

Referring to FIG. 4, in some implementations based on software resident on a computer 59, a software routine 50 updates both an on-screen representation 52 of an emulated return-to-center controller such as a "joystick" and data representing the emulated controller's displacement from its center or rest position. This update is in response to a physical computer pointing device 66 such as a mouse. A focus update routine 54 causes continual updates of internal data representing the user's focus in the hierarchy. When the focus is updated, a hierarchy draw routine 56 is invoked to render on-screen a representation 58 of a portion of the hierarchy surrounding the focus. (More detailed views of the emulated control and the rendered hierarchy are shown and discussed below.) Through the user's eye 60 the user's brain 62 continuously monitors the evolving hierarchy representation 58 as well as the current "joystick" position 52 over which the user has the feeling of direct control, the brain directing the hand 64 to move the physical pointing device 66 with its button depressed to effect further change in the focus and therefore in the portion of the hierarchy visible to the user. In this manner:

The user quickly learns through continuous feedback how to manipulate the rendered hierarchy to view beyond any node currently shown, and by iteration and the fact that all nodes are connected, to view the entire hierarchy.

No abrupt changes in rendering can occur and no abrupt changes in user hand or eye position are necessary.

In a network environment, a software component 70 of the invention is able to load hierarchy information from a remote hierarchy server 72 by way of a network of computers 74 onto the computer 59, which may represent a client of the hierarchy server. Typically a server will serve many clients concurrently. Hierarchy information loading 70 is described in more detail below with respect to FIG. 14.

Figure 5:
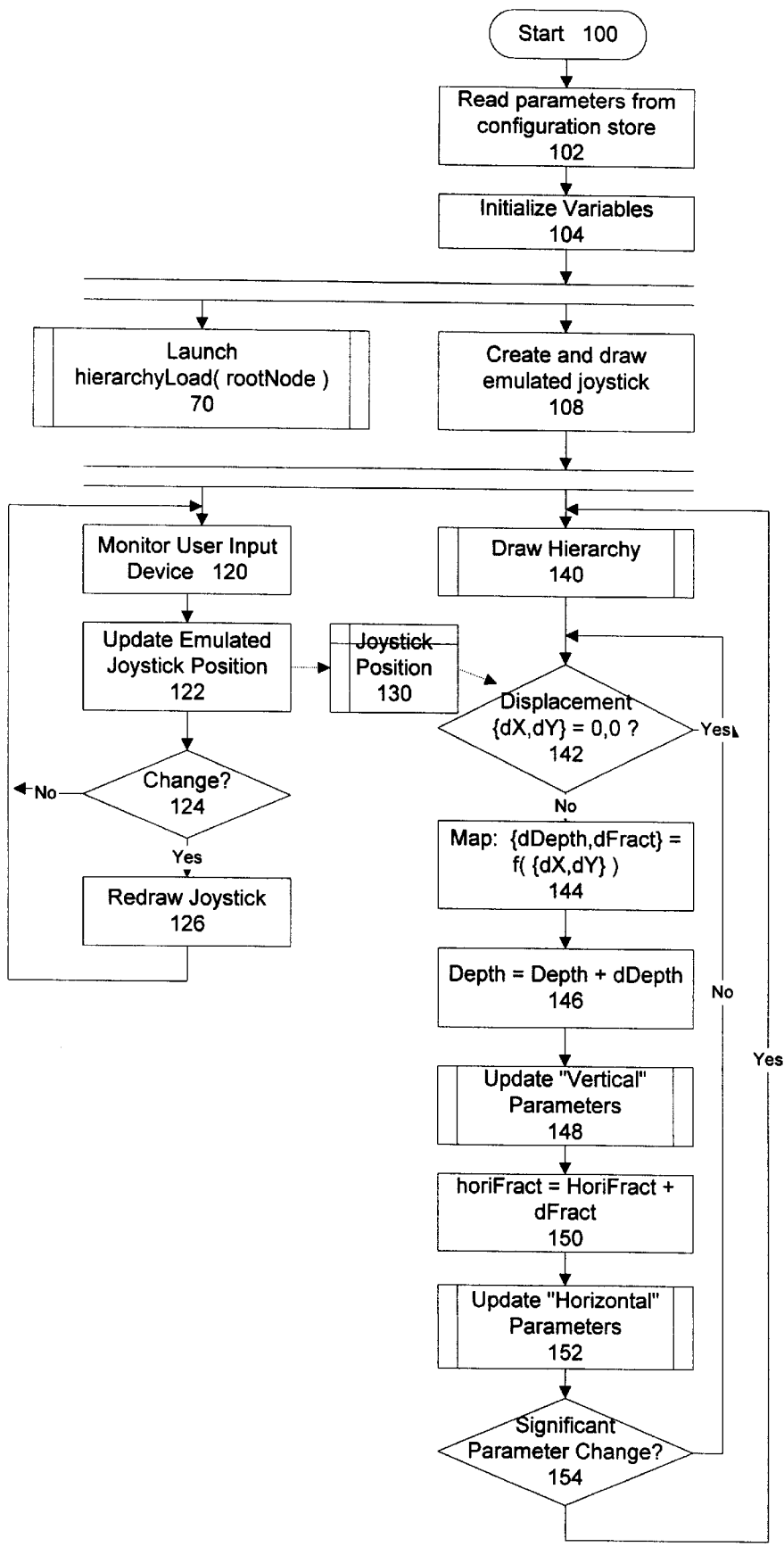
FIG. 5 is an overall flow diagram.

Referring to FIG. 5, starting at step 100, a software implementation initially performs some gathering 102 of configurable parameters which may include the display area dimensions and a network source for the hierarchy information. This is followed by initialization 104 of other variables. In step 104, a dummy root node is created and the hierarchy information source is associated with it. Step 104 also initializes the user "Focus"—the center of that portion of the hierarchy drawn on the screen—to a point near this dummy root node, which is all that exists of the local hierarchy data at this time. Next, the hierarchy loader 70 is launched to asynchronously load hierarchy information using standard network protocols from the configured source. The flow of hierarchy loading is described in more detail below with respect to FIG. 14. For now we note that: the source may exist on a remote server 72; the information may arrive following user-perceptible delay; and as information about a node arrives, it is added to the local hierarchy data.

The software next initializes 108 the emulated joystick and its on-screen representation. Next routines 120–126 are launched to asynchronously monitor the physical pointing device, while on a a parallel path the main loop is launched. This loop begins with drawing 140 the hierarchy on the screen.

Step 120 monitors the user input device to detect a change in the physical user-input device's "state" position and button state. A change may require an update 122 of the emulated joystick position 130. If a change in the emulated joystick position is detected at 124, the emulated joystick is redrawn at 126. This is illustrated below with respect to FIG. 15.

Returning to the main loop (the right side of the drawing), the emulated joystick is monitored at 142 for any displacement from its center position. When the displacement is non-zero in any dimension, the displacement is mapped by 144 to an incremental change in hierarchy "Focus". "Focus" means where in the hierarchy the user's current view of the hierarchy is centered. Focus is defined as a two-element vector, {Depth,Position-in-Level}. Hierarchy "Depth" is like hierarchy level, but is permitted to take floating-point values between the integers to which "level" is confined. "Position-in-Level" is a position among the nodes in a level, the leftmost having Position-in-Level 0.0, like an index, but permitted to take floating-point values between integral indices. For instance, a Focus of {1.1,1.5} in the sample hierarchy of FIG. 1 means that the user view is centered between levels 1 and 2 but closer to level 1, and horizontally midway between nodes 24 and 28.

Figure 8:
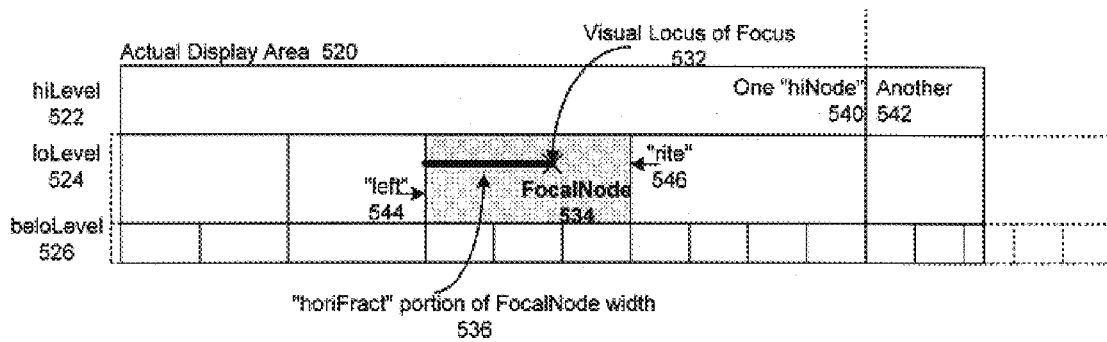
FIG. 8 illustrates concepts involved in allocating a level's display allocation to nodes within that level.

As will be seen in FIG. 8, an alternate method of specifying position within a level has two parts:

"FocalNode", a reference to that node in level <integral component of Depth> with an index of <integral part of Position-In-Level>; and "horiFract", the fraction of that node appearing to the left of the center of user view.

"FocalNode" therefore corresponds to the integral component of Position-in-Level and "horiFract" is the fractional component. It is this method of specifying position within a level which we will use in descriptions which follow.

Figure 15:
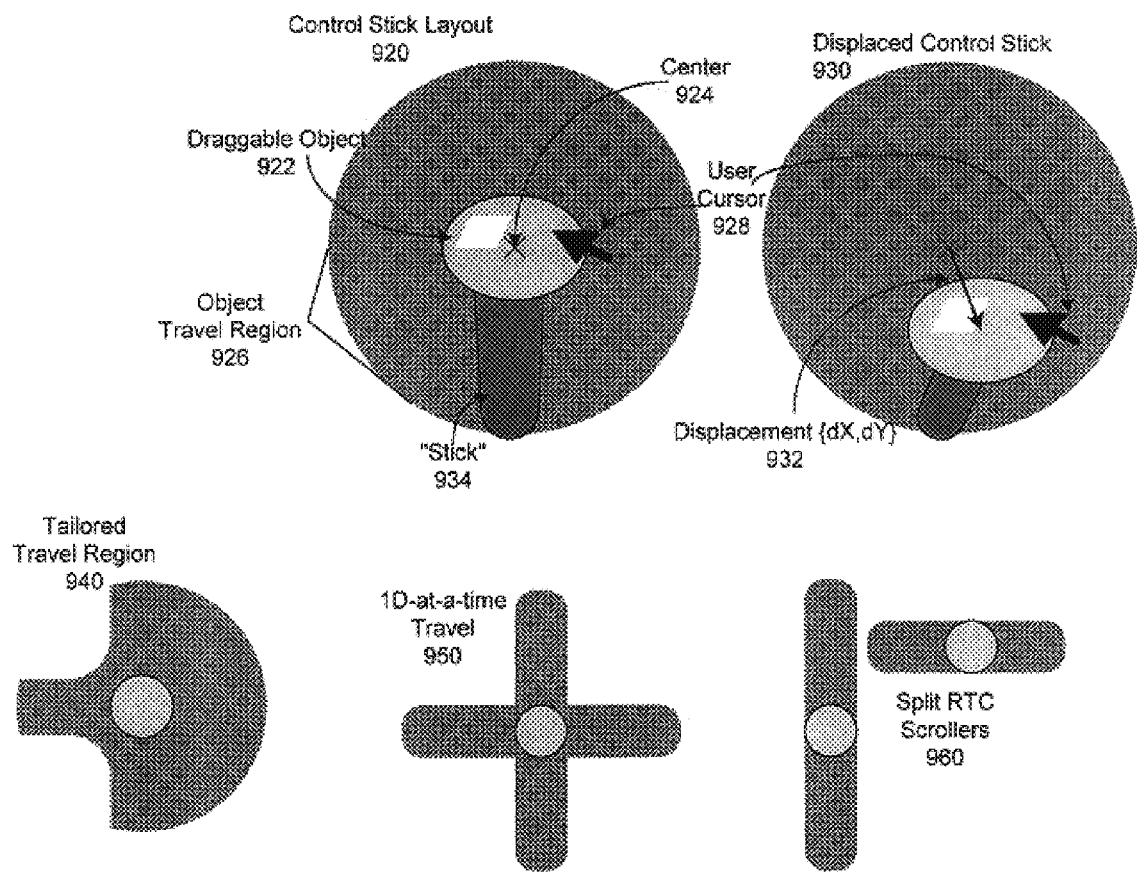
FIG. 15 illustrates how a "control stick" can be emulated and shows alternate appearances of emulated controllers.

The exact mapping 144 of emulated joystick displacement to a change in Focus {dDepth,dFract} depends upon the configuration of the embodiment, but for a configuration in which hierarchy levels are arranged horizontally and hierarchy descent/ascent are shown vertically, the mapping may be as simple as dDepth=k1*vertical displacement of emulated joystick dFract(change in horiFract)=k2*horizontal displacement of emulated joystick where k1 and k2 are numbers fixed during navigation. For a configuration in which hierarchy levels are arranged vertically, dDepth would follow the horizontal joystick displacement and dFract would follow the vertical displacement. Additional mapping tweaks found to be useful include:

greater-than-linear mapping to allow both fine control and high-speed navigation from an emulated return-to-center controller with limited travel. One implementation uses a dDepth proportional to the square of emulated controller displacement in one direction, for instance. This allows for a navigation speed "dynamic range"—ratio of fastest to slowest non-0 speed—of 12×12 in the case where emulated controller displacement in one dimension varies from –12 to 12 pixels.

attenuating diagonal navigation, particularly in the direction of hierarchy ascent. During hierarchy ascent the user typically does not intend any lateral navigation at the same time. During hierarchy descent diagonal navigation is often desired but can be attenuated to minimize risk that a user might sense losing control.

limiting emulated controller movement to one dimension at a time. This suggests an alternative rendering of the controller. FIG. 15 shows the "joystick" look and some alternatives. One implementation allows the user to select among alternative controller "look and feel" designs to find one most suitable to the user.

a mapping of displacement to dFract which is a function not only of displacement but which is sensitive to the fractional component of Depth in a way which eliminates $2^{nd}$-order discontinuities in the rendered location of nodes, given constant emulated controller displacement. (Implementations we are describing prohibit by design $1^{st}$-order discontinuities in node location or size regardless of controller state; this enhancement further eliminates a $2^{nd}$-order discontinuity.)

After adding the incremental change dDepth to Depth in 146, step 148 updates the "vertical" parameters using the logic shown in FIG. 7, discussed below. "Vertical" here means "in the direction of hierarchy descent or ascent", which may be visually either horizontal or vertical depending upon the configuration.

Figure 9:
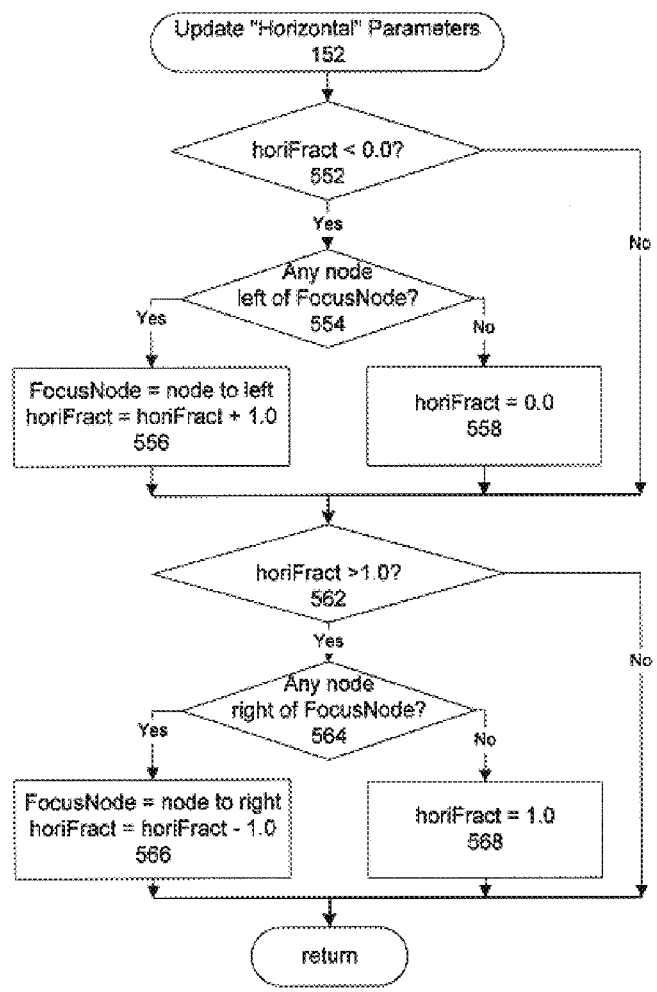
FIG. 9 shows logic involved in that allocation.

After adding the incremental change dFract to horiFract in 150, "horizontal" ("in the direction from a node to its sibling") parameters are updated in step 152 using the logic shown in FIG. 9, discussed below.

Step 154 tests if either Depth or horiFract has changed by more than a predefined threshhold since its last use in drawing the hierarchy. If so, the hierarchy is redrawn in step 140 using the logic shown in FIGS. 10 and 11. The purpose of the threshholds is to reduce demands on computer power by not launching expensive redrawing operations for visual differences small enough to approach imperceptibility.

In either case, the main operation loop continues with the monitoring 142 of the emulated controller's position. This loop is performed at nearly constant time intervals. As the logic of 144 maps a given two-dimensional emulated controller displacement to a two-dimensional Focus change per loop iteration, periodic iteration further maps it to a two-dimensional Focus velocity.

Figure 6:
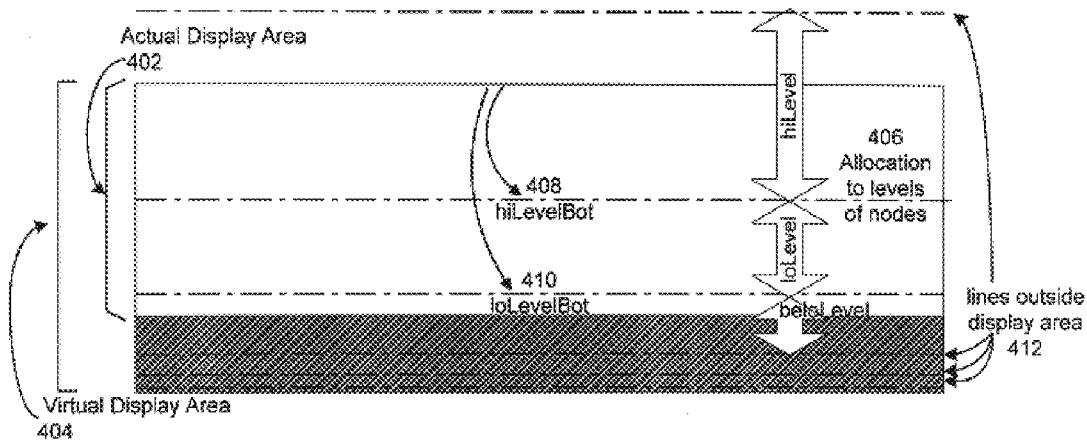
FIG. 6 illustrates concepts involved in allocating one dimension of the display area to hierarchy levels.
Figure 7:
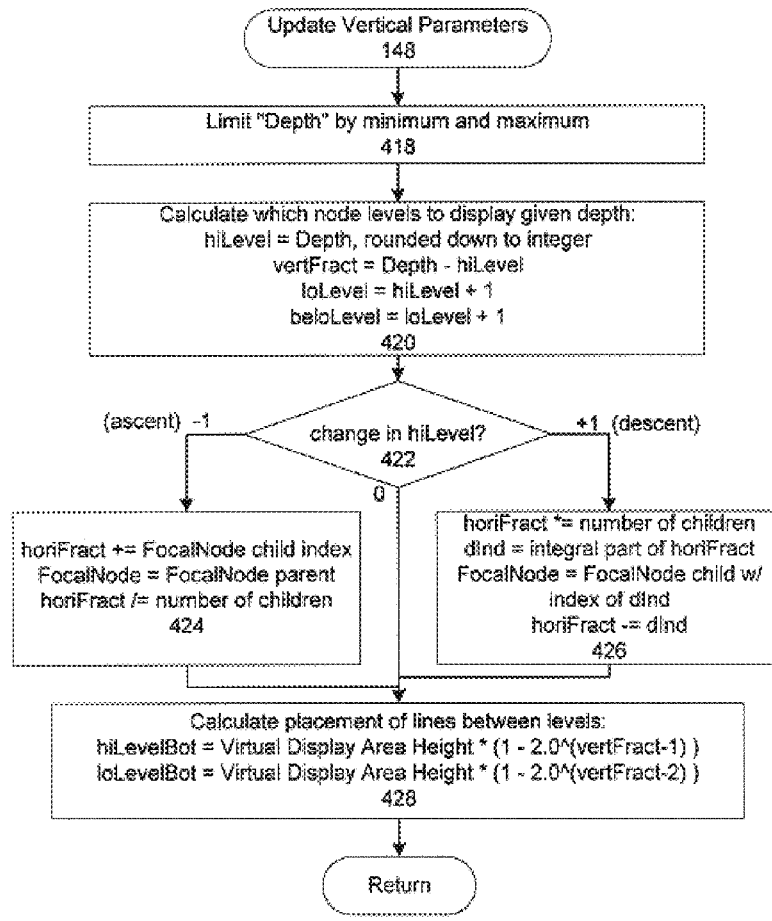
FIG. 7 shows logic involved in reallocating that dimension.

FIG. 6 shows how the display area 402 is to be allocated among some number of hierarchy levels by the logic in FIG. 7. 406 shows one possible allocation to three adjacent levels we call "hiLevel", "loLevel", and "beloLevel", where the parent of a loLevel node is in hiLevel and its children if any are in beloLevel. The allocated bands may lie partially outside (as with hiLevel) or completely outside (as with hiLevel-1) the actual display area 402. The thickness of allocated bands decreases geometrically with increasing level. For instance, if the ratio of thicknesses $R_{th}$ of adjoining bands is 2.0, as in the example shown, each level is allocated half the space allocated to its parent level. Note that as the user descends the hierarchy, a level of nodes is very small at its first appearance and gains visual weight as it approaches the focus; this seemingly gradual appearance of each node permits a visually smooth navigation experience.

The geometric relationship among band thicknesses is accomplished by arranging the lines delimiting the bands "exponentially". More rigorously, define a "Virtual Display Area" 404 of which the actual display area 402 is but a fraction $H_{ADA}/H_{VDA}$ between 0.5 and 1.0. Then the distance to the line at the top of level N from the bottom of the Virtual Display Area is:

$$\text{Virtual Display Area height} * R_{th}^{(Depth-N)}$$

(remembering "Depth" is one component of Focus), or for our example,

Virtual Display Area height$*2.0^{(Depth-N)}$ These level-delimiting lines will fall outside (above) the display area for N much less than Depth, and for increasing N, the lines approach the bottom of the Virtual Display Area, falling below the actual display area. The implementation illustrated chooses $H_{ADA}/H_{VDA}=\frac{3}{4}$ so that exactly two complete levels are shown. If Depth were a multiple of 1.0, hiLevel and loLevel would then be assigned the top ½ and next ¼ of the Virtual Display Area, totalling all of the actual display area. In the case illustrated, all of loLevel and parts of hiLevel and beloLevel fall in the actual display area. For any choice of $H_{ADA}/H_{VDA}<=\frac{3}{4}$, only the two lines 408 and 410 delimiting loLevel need be calculated for the purpose of drawing, as all others fall outside the actual display area. Drawing is sped up by the fact that at most 3 levels of nodes are involved. For implementations having access to greater resources, $H_{ADA}/H_{VDA}$ may be chosen closer to 1.0, so that more of the delimiting lines 412 fall within the actual display area, and more levels and many more nodes need to be represented.

Turning to FIG. 7, we see the logic 148 which accomplishes the vertical allocation illustrated in FIG. 6 in the case $R_{th}=2.0$, $H_{ADA}/H_{VDA}<=\frac{3}{4}$. This logic is invoked from the main operation flow of FIG. 5 when Depth has changed by a small fraction of 1 or −1, and serves to precalculate some drawing parameters. At step 418, Focus Depth is first forced to be greater than some minimum which is configurable but is typically near 1.0 and to be less than a maximum which is tied to the greatest level of any node loaded. Step 420 then determines which levels will be represented in the display area, or in other words what integers correspond to "hiLevel", "loLevel", and "beloLevel". The remainder from this rounding operation "vertFract" will be saved to determine the placement of the delimiting lines in step 428 and for later drawing calculations. A check 422 is made to see whether hiLevel has changed; that is if Depth has crossed an integer boundary. In most cases it has not. If hiLevel has decreased, horizontal parameters are changed in step 424: FocalNode's parent node becomes FocalNode, and horiFract is loaded with what fraction the former FocalNode's child index, augmented by the former horiFract, is of the parent's children. If hiLevel has increased, horizontal parameters are changed in step 426: the FocalNode child with a child index of horiFract times the number of children, rounded, becomes FocalNode, and the remainder from the rounding becomes horiFract.

Step 428 now calculates the placement of the delimiting lines. This was stated above to be $$\text{Virtual Display Area height} * 2.0^{(Depth-N)}$$

from the bottom of the Virtual Display Area. The formulae in 428 calculate the more useful distances from the top of the display area, hence the "1−". These distances "hiLevelBot" and "loLevelBot" are shown as 408 and 410 on FIG. 6. For $H_{ADA}/H_{VDA}=\frac{3}{4}$ this need only be calculated for the two integral levels N for which Depth-N is between 0 and B2.

FIG. 8 illustrates what "horizontal" allocation must do. The display area 520 having been "vertically" allocated into bands for the hierarchy levels hiLevel 522, loLevel 524, and beloLevel 526, each band must be further allocated to specific nodes. "Focus" can be thought of as an imaginary point in the hierarchy that corresponds to the center of the display area 532. "FocalNode" is that node which will be drawn to include this center; the shaded box 534 is its allocation. "horiFract" is the ratio of FocalNode appearing to the left of the center, 0.0<=horiFract<=1.0. That is, horiFract is the ratio of the solid black line 536 to the width of FocalNode's rectangular allocation 534. "Horizontal" allocation occurs mostly during drawing using the logic illustrated in FIGS. 10 through 13. FIG. 9 shows some precalculation which is performed after an incremental change to horiFract: If at 552 horiFract has spilled over and is no longer>=0, step 556 replaces FocalNode with the node to its "left" in the hierarchy and 1.0 is added to horiFract, unless there is no left node in which case step 558 clips horiFract to 0.0. If at 562 horiFract has spilled over and is no longer<=1, step 566 replaces FocalNode with the node to its "right" in the hierarchy and 1.0 is subtracted from horiFract, unless there is no right node in which case step 568 clips horiFract to 1.0.

Horizontal allocation is driven by determining the widths of nodes in level loLevel as they are drawn, first for FocalNode, then iterating through nodes to its left until the display area is used, then iterating through nodes to its right. The display area width required for a node depends on the width required to render it and the sum of rendering widths of its children. The geometric weight given to each of these two factors varies with the fractional component of Depth. As illustrated, a loLevel node is narrower than another having more children (in beloLevel) but its children are wider than those of the other node. From loLevel width allocations:

child node width allocations are simply prorated. For implementations which can show more than three levels of nodes at a time ($H_{ADA}/H_{VDA}>\frac{3}{4}$), proration continues beyond beloLevel. For instance, if a loLevel node has width W and 3 children each with 3 children, each child has width W/3 and each grandchild has width W/9 allocated.

parent node (in hiLevel) width allocations are summed from their children's widths. In FIG. 8, four loLevel nodes have one parent 540 and the last has another 542. Before turning to the drawing logic in FIGS. 10 and 11 which accomplishes this, note the horizontal-parameter terminology that will be used: "left" and "rite" are the left and right boundaries of a node's display allocation, marked by 544 and 546 for FocalNode on FIG. 8.

Figure 10:
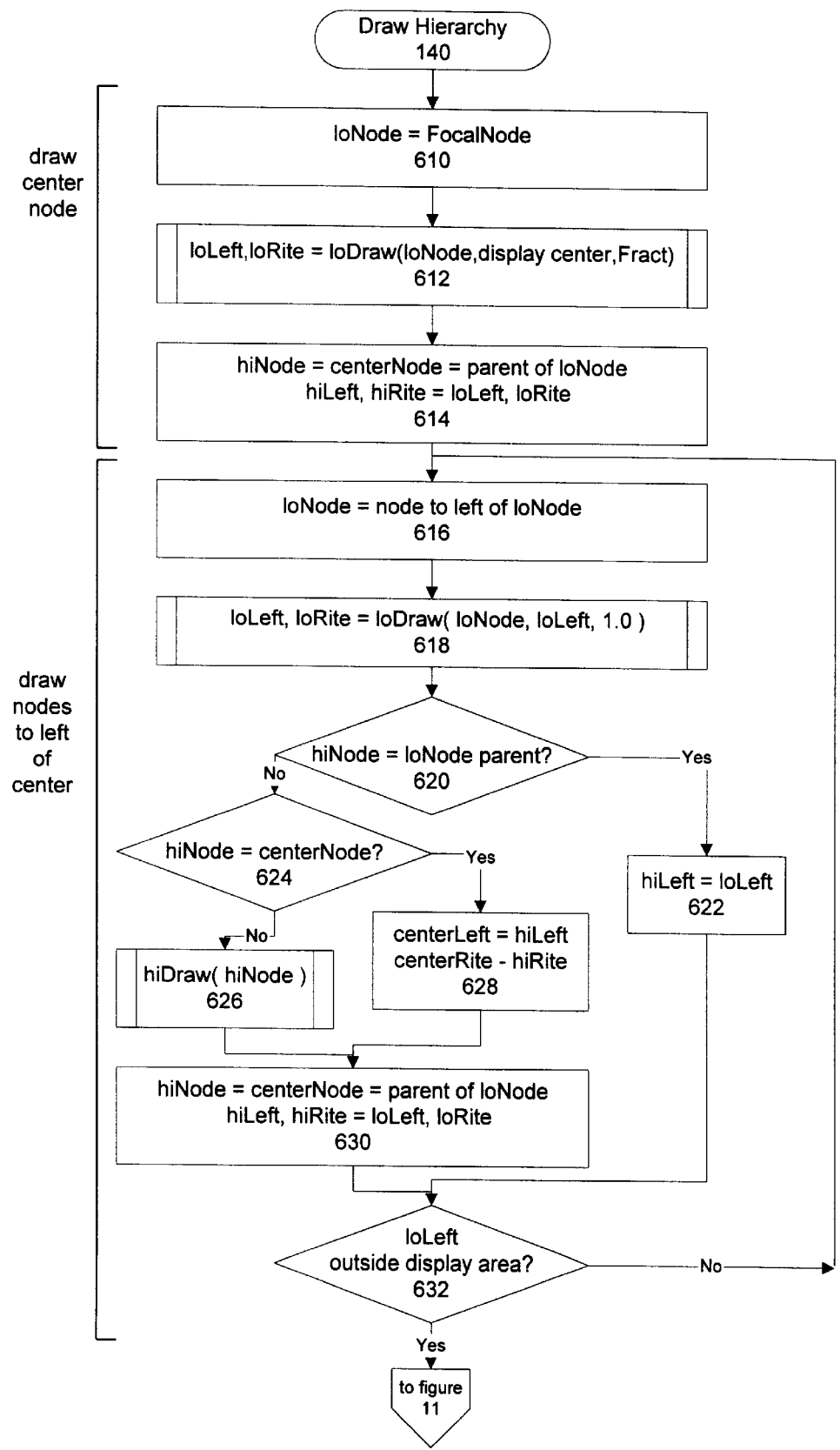
FIG. 10 and FIG. 11 illustrate a process of rendering a portion of the hierarchy.
Figure 11:
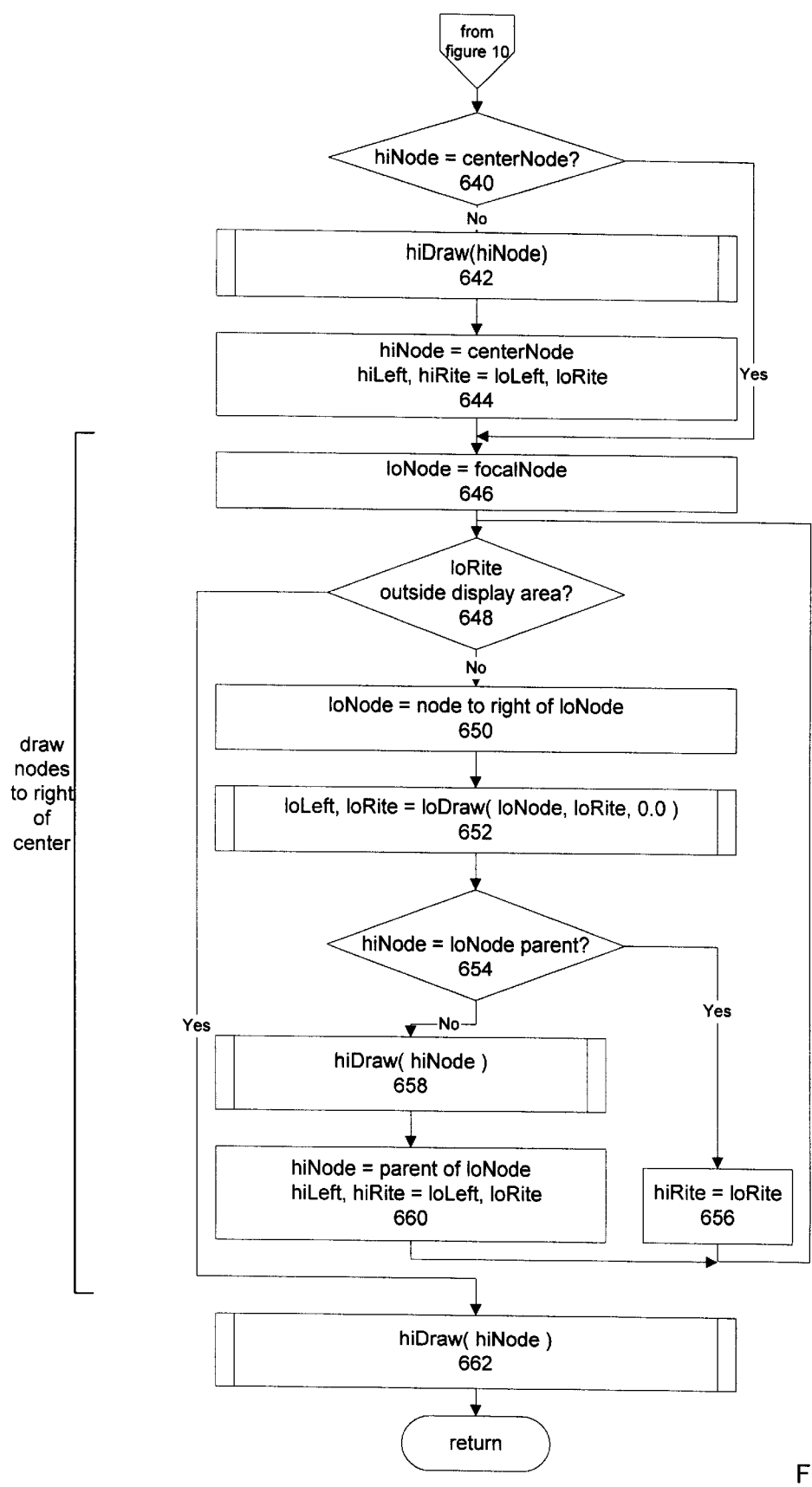
Figure 12:
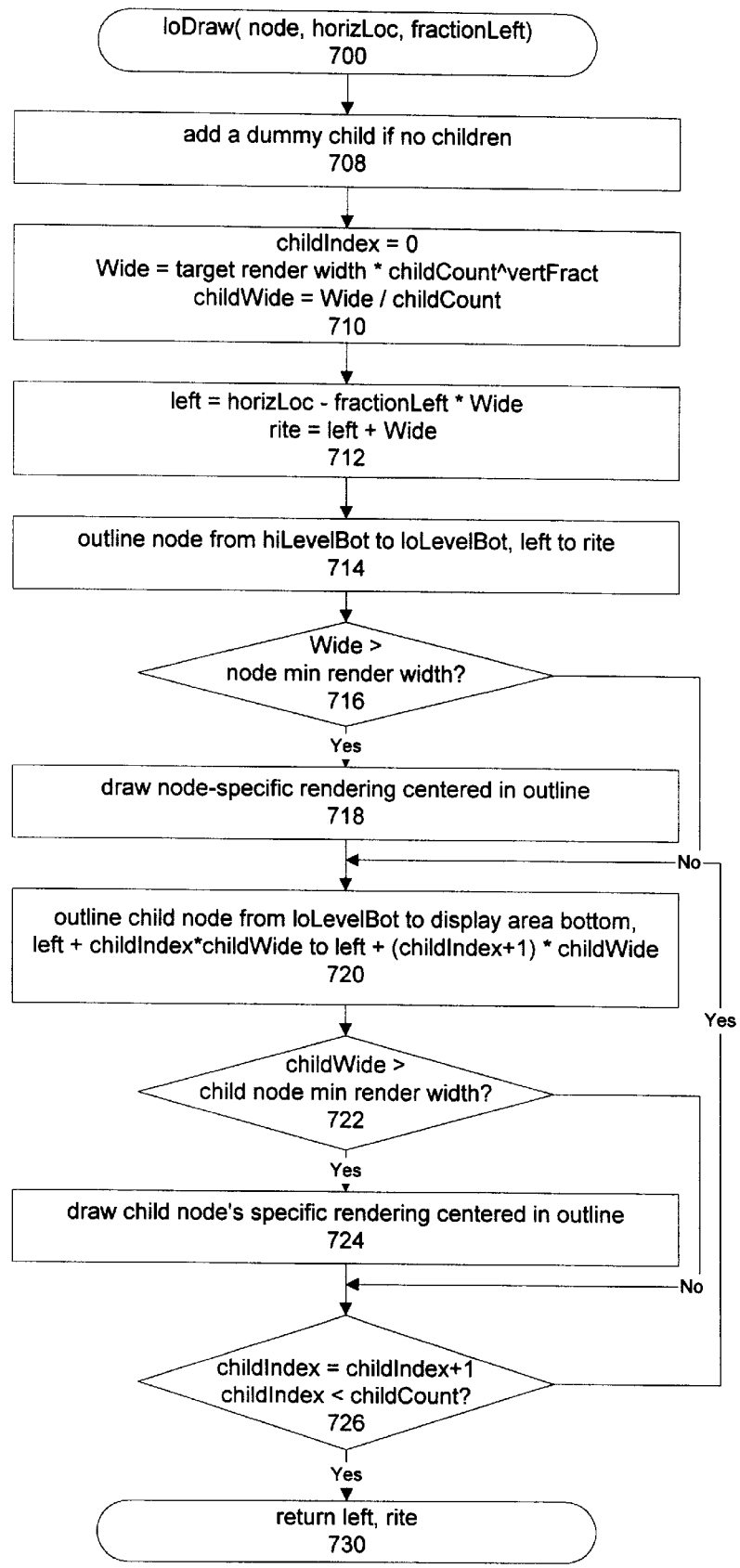
FIG. 12 illustrates a subroutine used to draw a node at one level and its children.

The drawing logic of FIGS. 10 and 11 can be roughly divided into areas drawing FocalNode, drawing nodes to its left, then drawing nodes to its right. The software routine "loDraw(node, horizontal position, fraction to left)" which will be described in reference to FIG. 12 is invoked for each loLevel node (steps 612, 618, 652) not only to draw it but to calculate and return its "left" and "rite" boundary locations, and to draw its children. After each loLevel node is drawn, its width is added to that of an accumulating parent node "hiNode", either a new one (steps 614, 630, 660) or an existing one (steps 622, 656). A new "hiNode" is needed when the loLevel node just drawn has a parent which is not hiNode, as checked at 620 and 654. At this time, and at the end of the routine, the existing hiNode is drawn using the software routine "hiDraw(node)" (steps 626, 642, 658, 662).

FIG. 12 illustrates the logic of software routine "loDraw (node, horizontal position, fraction to left)". Step 714 outlines the node and step 718 draws the node-specific representation concentric with the outline. For each child, step 720 outlines the node and step 724 renders it in the case where the outlined area is large enough to hold the rendering. How many outlined nodes are fully rendered for any given Focus depends upon the space demands of rendering each, upon the display area dimensions, and upon how quickly the hierarchy fans out. However, for typical applications, nodes on three levels are always outlined and are fully rendered about half the time, and nodes on only two levels are fully rendered the other time.

Prior to the outlining and drawing, loDraw( ) must first (step 710) calculate the node's allocated display width "Wide" given the fractional component of Depth "vertFract", the number of child nodes, and a target rendering width using the formula $$\text{target render width} * \text{childCount}^{vertFract}$$

It must then (step 712) convert "Wide" and the incoming parameters "horizLoc" and "fractionLeft" to "left" and "rite", its left and right edges. "horizLoc" is a horizontal location; it specifies the left edge if "fractionLeft" is 0, right edge if "fractionLeft" is 1, and some point in between for 0<fractionLeft<1.

To "draw node-specific rendering" may mean invoking primitive code to render text and/or graphics. However for performance reasons in some implementations this means copying a prerendered image to the outline center, so that the time spent in rendering each node need only be incurred once.

Figure 13:
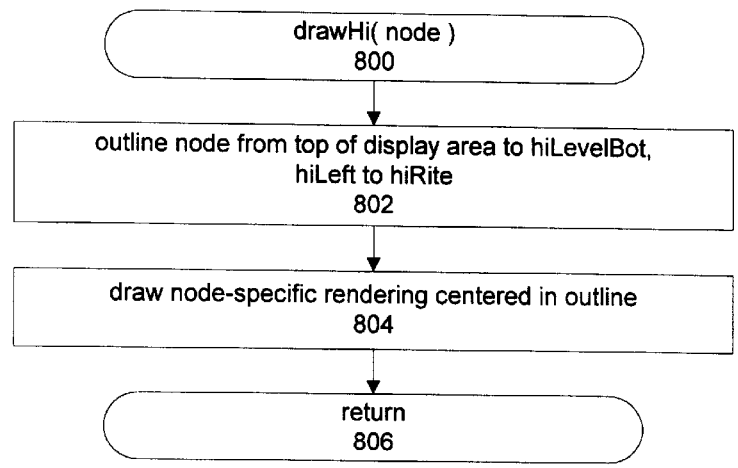
FIG. 13 illustrates a subroutine used to draw a node at another level.

FIG. 13 illustrates the much simpler logic of drawing a hiLevel node: outline the node, then draw its node-specific rendering.

If calculations of level-delimiting lines and node widths would place some of a node outside the actual display area, node outlines are made to respect the boundaries of the actual display area. Centering node-specific rendering in this reduced area minimizes the number of cases in which node-specific rendering overflows the actual display area. Such cases can be completely eliminated or can be permitted by choices in defining "target render width" and "min render width" used in steps 710 and 716.

It is not a part of drawing, but associated with outlining any node in step 802 on FIG. 13 and steps 714 and 720 on FIG. 12, the node is checked for an unread input source. If it has one, software routine "hierarchyLoad" is launched to asynchronously populate the hierarchy beneath this node from hierarchy information read from the source. The hierarchy information loaded by the first invocation of hierarchyLoad, which populated the hierarchy under the dummy root node, may not be the complete hierarchy for this application. The hierarchy server may deliver only a portion of the hierarchy information, with references to additional portions. This can allow a user to widely navigate an immense hierarchy while triggering the transfer of only a small fraction of the hierarchy information from the hierarchy server to the client. The portions are loaded on demand but before they are actually needed for rendering by calling for them when their parent nodes are first outlined.

Division of the total hierarchy into smaller portions can be accomplished by human or automated extraction of the information into separate files resident on the hierarchy server. Alternatively, the hierarchy server can automatically divide the hierarchy into portions, each with a magnitude appropriate to the network bandwidth, and automatically generate references to information "files" describing sub-hierarchies of the total hierarchy. That is, the "files" sent over the network may never exist in the file format.

We call the delivery of a hierarchy in portions and on demand "hierarchy streaming", whether division into portions is prior to or a part of server operation. "Hierarchy streaming" is comparable to "streaming" as the term is generally applied to the transmission of data incrementally over a network concurrent with use of the (already-received) data by the client, as for instance when sound information is played by a client computer as additional sound information is still being transmitted. However, hierarchy streaming differs in that the information delivered is of more than one "dimension" and there is a strong likelihood that not all of the information will be needed at the client. Therefore two-way communications are useful in hierarchy streaming. Not only must the server deliver information, but the client must request different portions of the hierarchy as they are needed. A hierarchy-streaming performance enhancement is to maintain exactly two connections (one for each direction) between the client and the server, rather than opening and closing a connection for each portion.

The minimize size of streamed portions may be a fixed server parameter. For a performance enhancement, the hierarchy server may adjust the minimum portion size in response to network characteristics as they vary between clients and over time. For instance, a server receiving rapid-fire requests for portions from one client might infer a high-bandwidth connection and deliver larger portions to that client, and it might infer a high error rate from repeated requests for the same portion from another client and deliver smaller portions to that client.

Here is how a hierarchy server might serve a request for hierarchy information while respecting a minimum portion size:

From the request, identify the parent node of the hierarchy or subhierarchy for which information is requested.

Copy that node's information from the overall hierarchy data—which may be in a database, one or more files, or an in-memory data structure—to a new hierarchy data structure, as the root node information.

Among information copied for each node can be a reference to the portion of the hierarchy for which that node is the root. A "reference" to a portion is information from which a request for the portion to the server can be constructed. For this first copy, the reference simply reflects the original hierarchy information request.

Among references that have been added to the new hierarchy data structure and still remain, take that added earliest, remove it from the data structure, and copy information for all child nodes (of the node containing the reference) from the overall hierarchy data to the new hierarchy data structure. Again, the copied information may contain references.

Figure 14:
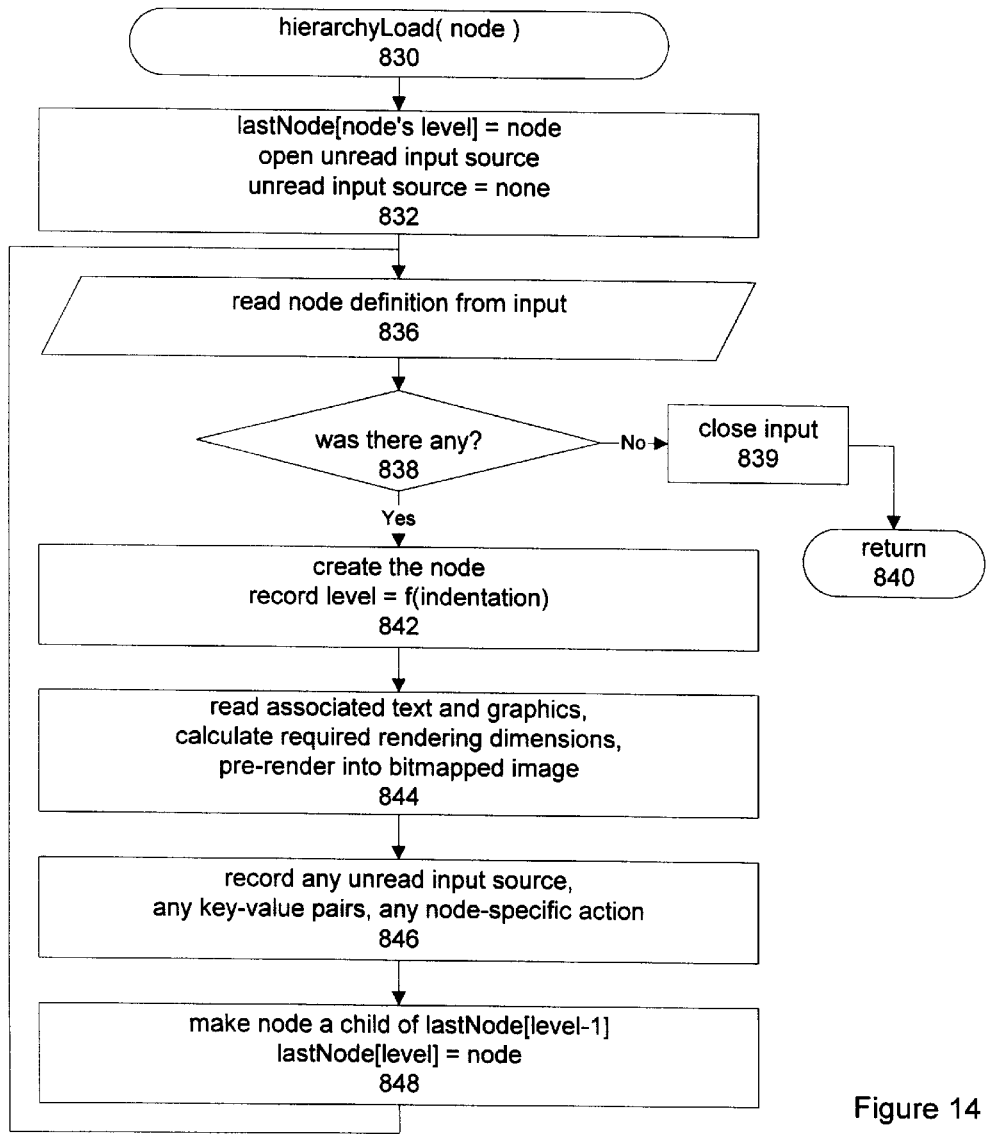
FIG. 14 illustrates logic used to load hierarchy information from a server.

Repeat the previous step while references remain and while the new hierarchy data structure is smaller than the minimum portion size. FIG. 14 shows the hierarchy-loading process from the client point of view. Software routine "hierarchyLoad" is passed a node that has an associated "unread input source". This is a string that names a path, such as a "URL" for internet access or a filename, to a hierarchy definition file. The hierarchy source could also be a database, a data structure, or another program, but here we will describe transfer of a file over the internet. Step 832 "opens" the source or makes it available for reading. In a client-server context, this "open" constitutes a request to the server to provide the hierarchy information. In a loop, step 836 is used to read each line, until failure to read detected at 838 terminates the routine at 840. Each line describes one node, specifically:

The node level relative to the top node level of the file. This is a relative specification so that hierarchy definition files can be combined by simply referring to a hierarchy definition file from a node specification in a "parent" hierarchy file. The top level of the "child" hierarchy definition file is then one more than the referring node's level. In this way hierarchy modules can be readily split and recombined by humans using editors. In some implementations, hierarchy definition files are human-readable and editable; the format facilitates this by using line indentation to specify relative level. Indentation increased from the previous line indicates a level one greater; indentation decreased to a previously used indentation indicates the level previously indicated by the indentation. For instance a file like this Node 1
  Node 2
    Node 3
Node 4 would cause node 1 and 4 to be placed at level N, node 2 at level N+1, and node 3 at N+2, where N is one greater than the level of the node referring to the file.

- (optional) text used as a node "label" for rendering the node
- (optional) a path to a graphic "image" for rendering the node. If both a label and a graphic are specified, the label is rendered on top of the graphic. A current implementation uses the format "<image=URL>" for this information.
- (optional) a specification of an "action" to take if the user selects the node, as by "clicking" it with a pointing device. Each "action" is interpreted by software communicating in an application-dependent way. The format "<action=URL>" can be used for this information. Some implementations render those nodes which have associated actions with a push-button-like appearance to suggest to the user that clicking the screen appearance will have an effect.
- (optional) a "hier" reference specifying the source for a hierarchy to be loaded beneath this node. A current implementation uses the format "<hier=URL>" for this information.
- (optional) any number of "<key=value>" specifications assigning a short string to represent a long string so that "action", "image", and other specifications can use a sort of shorthand. Such assignments are valid for such specifications for all of the node's descendants.

Step 842 represents the parsing of node level. Parsing of the other specifications is shown in steps 844 and 846.

At step 848, the new node is placed in the hierarchy data structure as a child of the node added most recently (by this execution instance of hierarchyLoad) at the previous level, and this node is recorded to be the most recently added at this level. This can trigger a redrawing of the hierarchy in cases where the affected parent node is currently being displayed.

FIG. 15 shows a preferred screen layout of an emulated return-to-center controller (a pointing device like a joystick which returns to a resting position when it is released) and a few alternatives.

Referring to the "control stick" view 920 we describe how a return-to-center controller is emulated when the user has available a non-return-to-center pointing device with a button such as a mouse. Navigation begins when the user guides the mouse to "drag" display object 922, here an oval representing the top of a control stick, in any direction from its rest position 924 in the center of the region 926 (shown shaded) in which the object may travel.

"Drag" means that the user clicks on the object and moves the mouse with its button depressed. While the button is depressed, the emulation moves display object 922 to follow the pointer as limited by the travel region. Specifically, if the "cursor" 928—an on-screen representation of the position of a user mouse or other pointing device provided by an operating system—is at the position shown in view 920 when the button is depressed, and the user subsequently causes it to move to its position shown in view 930 with the button still depressed:

Step 120 "Monitor User Input Device" of FIG. 5 detects these events.

Step 122 "Update Emulated Joystick Position" then moves display object 922 by the same amount in each dimension that the cursor has moved, and will record this current displacement, the vector 932.

This displacement of the emulated controller is then used by other parts of the invention as if it were the displacement of a physical return-to-center controller.

Step 120 also detects the release of the mouse button, at which time step 122 moves the display object 922 back to its rest position centered at 924 and updates the emulated controller displacement to {0,0}.

The further the object is dragged from the rest position, the greater the emulated controller displacement, and the more rapidly the Focus changes, by the mapping 144 of FIG. 5.

By always rendering the "stick" part of the control stick with one end at the bottom of the travel region and the other end near the center of display object 922, the image approximates the look of a control stick viewed from above but not directly above, so that in view 930 the stick appears foreshortened.

Each of the following alternative layouts also show a round draggable object at its rest position in a shaded region of allowed travel. Alternate layout 940 is for a vertically displayed hierarchy with the hierarchy root being to the left. It shows a round object which can be dragged left in the direction of hierarchy ascent or in any combination of the opposite and perpendicular directions. Lateral navigation in combination with hierarchy ascent is prohibited. Layout 950 shows a layout that completely restricts travel to one dimension at a time. Layout 960 splits this into two separate scrollers, each of which is "return-to-center".

Figure 16:
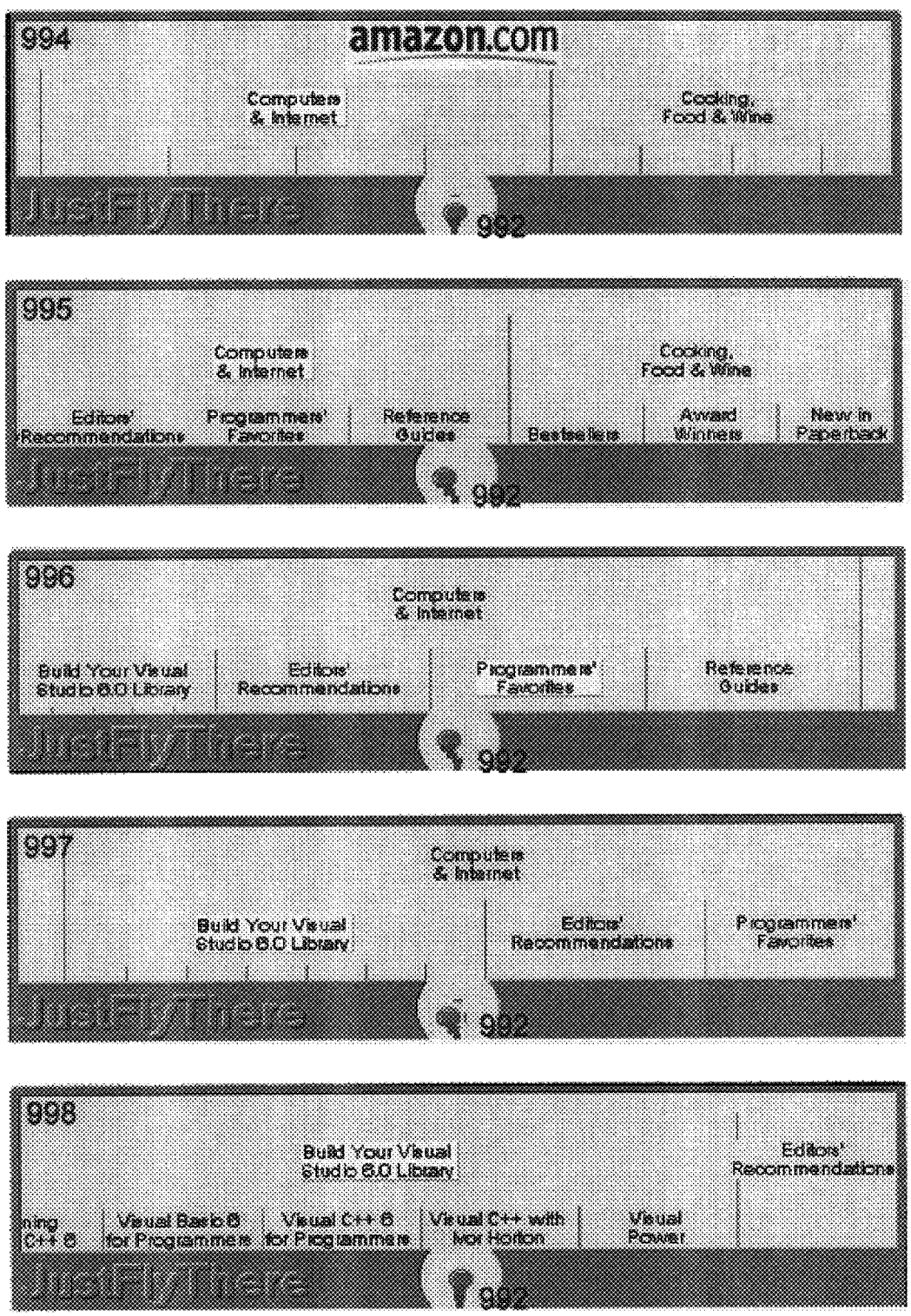
FIG. 16 shows a sample sequence of views presented to a user navigating a hierarchy by nudging the control stick at the bottom of the view, where the implementation is configured horizontally with the top of the hierarchy at the top of the view.

FIG. 16 shows a sample sequence of views presented to a user navigating a hierarchy by nudging control stick 992 away from its rest position in the center of the round area surrounding it. The illustrated implementation is configured horizontally with the top of the hierarchy at the top of the view. The views shown here are only samples from the animated sequence of views the user sees. While viewing view 994, the user nudges control stick 992 downward to descend the hierarchy, then at about the time of view 995, the user moves control stick 992 to the left to swing left as well as downward through the subnodes of the node labeled "Computers and Internet". At about the time of view 996, the user is cruising due left to center "Build Your Visual Studio 6.0 Library". Then as shown below view 997, control stick 992 is again pushed slightly downward to bring the child nodes into view 997. At this point the user releases control stick 992 and it returns to its home position as shown.

Figure 17:
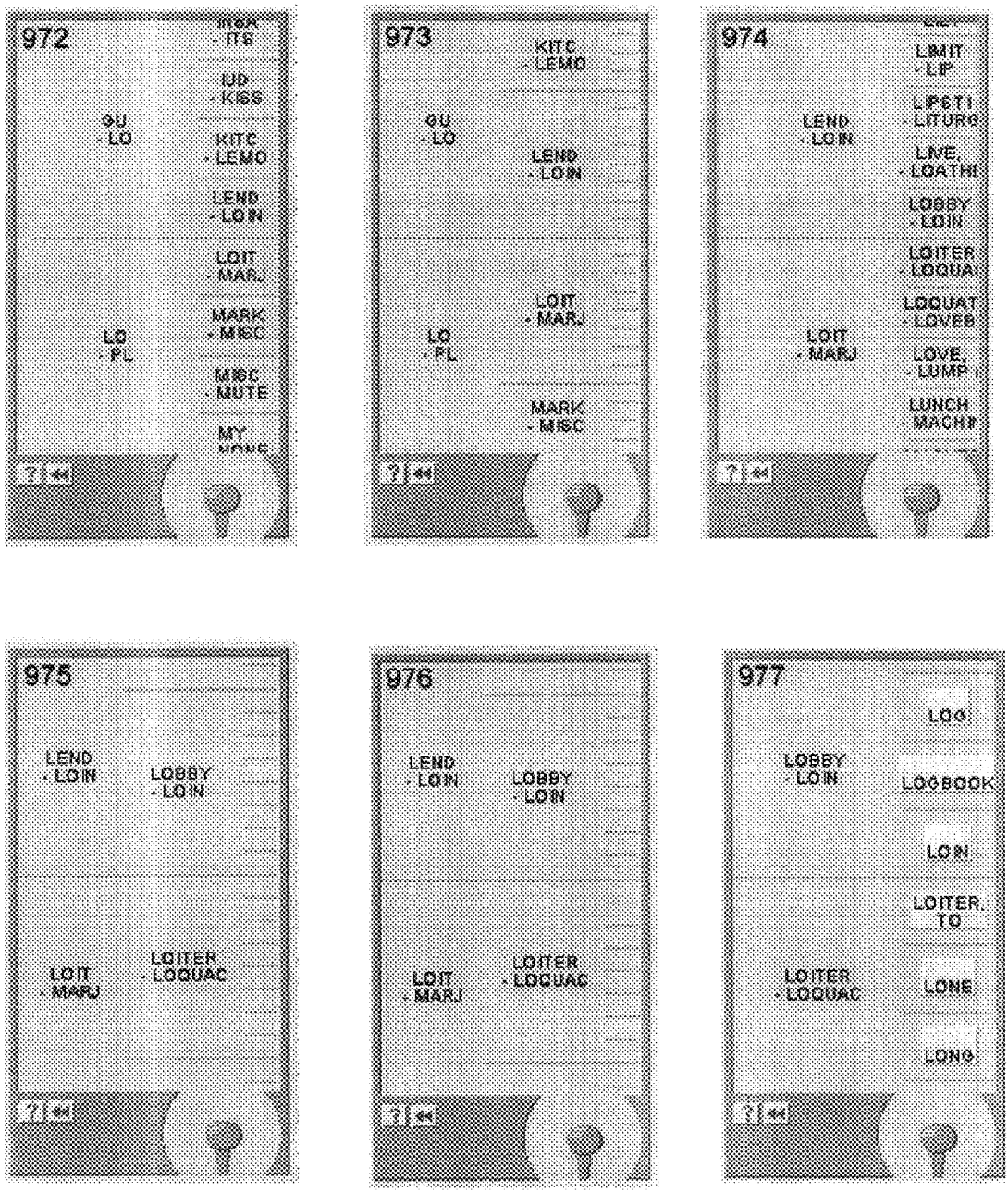
FIG. 17 shows a sample sequence of two views presented to a user navigating a dictionary, where the implementation is configured vertically with the top of the hierarchy at the left side of the view.

FIG. 17 shows a sequence of six views 972 through 977 presented to a user navigating indexed data (in this case, a dictionary), where the implementation is configured vertically with the hierarchy root at the left side of the view. Again, the views shown here are only a sampling of the animated sequence of views the user sees. In this sequence, the user is drilling directly "down" in the hierarchy by pushing the control stick to the right. As the non-leaf nodes are of no interest to the user other than as an aid to navigation, they are not "active". Only the leaf nodes appearing in view 977 are active and appear as buttons.

Figure 18:
FIG. 18 shows a hypothetical deployment at a single web site to allow rapid seamless navigation of that site.

FIG. 18 illustrates a hypothetical deployment at a single web site to allow rapid seamless navigation of that site as it would appear in a browser window. Visually, a page at the site is composed of a main frame 986 and a navigation frame 984. A vertically-oriented view of a hierarchy 980 and an emulated control stick 992 appear in the navigation frame. The hierarchy in this case is the hierarchical organization of a web site. Each node corresponds to a page in the site hierarchy which can be loaded into the main frame, and a node's associated action is interpreted to cause a load of the corresponding page into that frame. We see the site just after the button labeled "Museum Review 1998" was clicked, causing the corresponding content to be loaded into the main frame.

Other embodiments are within the scope of the following claims.

The invention is easily applicable to a wide range of uses because:

Hierarchies are ubiquitous.

Hierarchy geometry is input as part of the hierarchy information rather than hard-coded in an implementation.

Node-specific appearances are input as part of the hierarchy information rather than hard-coded in an implementation.

Node-specific actions are input as part of the hierarchy information and are interpreted by a surrounding application in an application-specific way rather than by the invention.

The invention can be applied to navigating a file system. For such purposes a node-specific action might be, for files, to open a file in a file-type-specific way, and for directories, no node-specific action is necessary as navigation itself "opens" the directory. The invention can be applied to file systems in a network logically combined as if they comprised one large file system.

The invention can be applied to allow easy user navigation of a hierarchically organized set of pages at a large web site, as illustrated in FIG. 18. The small display area demanded by the invention to navigate a hierarchy of any size can be placed in a "navigation frame" of a browser window, allowing the user to browse the site and from there control the content of a larger "main frame" of the window. More generally, the invention can be likewise be applied to allow easy user navigation of any hierarchically organized set of web pages which may reside in a large number of different sites. For such purposes, a node-specific action places the web page advertised by the selected node in the main frame. The invention can be deployed for such an application by several means, including as a "java applet", as a "plug-in", or as a part of the browser itself.

The invention can be applied to navigating a document with an outline. A node-specific action in this case places the user in the associated part of the document. "Document with an outline" includes well-outlined books such as most textbooks, Bible versions which have been divided into book, chapter and verse, and many reference and how-to books.

The invention can be applied to navigating a flat list by "indexing" the list or file. That is, a hierarchy can be created in which the last level is comprised of leaf nodes associated with the goal of navigation, the elements of the list. (For a dictionary example, leaf nodes are associated with words.) All other nodes are synthesized and labeled to provide reliable signposts for getting to the right leaf nodes. (In the dictionary example, these would identify alphabetic ranges like "Aar–Byz".) The non-leaf nodes then would have no node-specific action. A leaf node's action for a dictionary might be for the computer to print or to speak a definition or a translation. The action for a contact list leaf node might be to print an address, start an email message, or dial the phone. FIG. 17 illustrates such alphabetic navigation of a word list.

The invention can be applied to navigation of an XML file, either to edit the file or to create a flexible application driven by the XML file.

The invention can be applied to user navigation of an encoded hierarchy such as the Dewey Decimal System. In this case a node-specific action might bring up information about the book.

The invention can be applied to allow easy user entry of postal addresses or other locations by browsing hierarchically arranged geographic regions. For instance, child nodes of a node labeled "New England" might be labeled with state names.

The invention can be applied to allow rapid user entry of numeric data such as a postal code, where the child nodes of a node labeled "347" would be "3470", "3471", "3472", "3473", "3474", "3475", "3476", "3477", "3478", and "3479", and a postal-code hierarchy could thus be synthesized.

The invention can be applied to allow easy user selection of categorized products. A recorded song for instance might be categorized at the top level as "music", then "rock/pop", then "hip-hop", then by recording artist, then by recording, then by track title.

The invention can be applied to entry of text from any set of characters. For a large character set such as "hanzi" used for the Chinese language, characters can be categorized into a hierarchy using conventional indexing methods (Chinese dictionaries are typically categorized by number of strokes), or in some other way, such as categorization by visual similarity. The invention is particularly applicable when a keyboard is unavailable or impractical for text entry.

The invention can be applied to allow easy user navigation of content which is not hierarchical in its native mode (such as a large unorganized site, a corpus of literature, or the entire web) but upon which a hierarchy can be imposed using "self-organizing maps" or other similarity-seeking technology.

What is claimed is:

1. A method comprising identifying a position in a space associated with a hierarchy of nodes, each of the nodes being uniquely identifiable within the hierarchy by a node level value identifying the node's level in the hierarchy and a node-in-level value identifying the node's location uniquely among nodes in that level, the space associated with the hierarchy of nodes having at least two dimensions, the position in the space being identified by a depth value comprising the node level value and an offset from that node level value and a position-in-level value comprising the node-in-level value and an offset from the node-in-level value.

2. The method of claim 1 in which the depth value offset comprises a non-integral number.

3. The method of claim 1 in which the position-in-level value offset comprises a non-integral number.

4. The method of claim 3 in which the position-in-level value comprises a node-in-level value identifying one node plus a floating-point number representing an offset of the position from that node.

5. The method of claim 1 further comprising using the position in the space to identify a focus of a user's view of the hierarchy.

6. A method comprising dividing an area on a display into subareas, each position in the area belonging to one of the subareas;

each of the subareas associated with a node in the hierarchy of nodes;

the entire area of each of the subareas representing the associated node at a given time, and receiving an indication of an action to be taken, the indication being received at any arbitrary position within the area of the display at the given time, the indication being unambiguously associated with the node associated with the subarea that contains the arbitrary position.

7. The method of claim 6 in which the nodes in the hierarchy are organized in levels and at least some of the nodes of one level are fully represented in a direction of the display that corresponds to different levels, and at least some of the nodes of levels of the hierarchy above and below the one level are at least partially represented.

8. The method of claim 7 in which each of the levels is represented as a band of node representations in the area, nodes represented in one band have a parent-child relationship with nodes represented in an adjacent band, and, within a band representing one level, the area is divided so that the subarea allocated to a parent node in that one level has the same extent along the band as the sum of the extents of the subareas in the adjacent band representing another level that are allocated to the children of the parent node.

9. The method of claim 1 or 6 also comprising an area that provides a navigational interface that permits continuous navigation, based on a user's continuous activation of a user interface device, of a hierarchy of nodes, the interface displaying information about a portion that is less than all of the hierarchy at one time, the portion changing apparently continuously in response to the user's continuous activation of the user interface device.

10. The method of claim 9 in which the nodes comprise links to web pages.

11. A method comprising displaying a representation of a portion of a hierarchy of nodes to a user, enabling a user to vary the portion of the hierarchy that is displayed by performing a first type of user-interface action not directed within the displayed representation of the portion of the hierarchy, the change in the portion of the hierarchy that is displayed being accompanied by a change in the scale at which at least some of the nodes of the portion are displayed, allowing, by a second type of user-interface action directed within the displayed representation of the portion of the hierarchy, a selection of any node in the portion of the hierarchy of nodes of which a representation is being displayed, and reporting each selection to an application to invoke node-specific behavior by the application, the node-specific behavior being other than affecting the representation of the hierarchy, and the application being other than the representation and navigation of the hierarchy.

12. The method of claim 1, 6, or 11 also comprising for a node in the hierarchy of nodes, rendering an outline and a representation of node-specific information, the outline having dimensions that change with an amount of space dynamically allocated to the node based on a changing focus in the hierarchy, the representation having unchanging dimensions, drawing the outline and the representation on a display, and when the focus changes, re-rendering the outline with updated dimensions, and without re-rendering, copying the rendered representation to a new location.

13. The method of claim 12 in which the drawn container indicates the node's position in the hierarchy and its relationship to nearby nodes.

14. The method of claim 13 in which the representation includes graphics or text or both.

15. The method of claim 1, 6, or 11 also comprising receiving information indicating current displacement of a user input device within a two-dimensional frame of reference from a zero position, and translating the received information indicating the current displacement in at least one of the dimensions to a rate of change of position of a user's focus in a display of a portion of the hierarchy.

16. The method of claim 15 in which one dimension represents a depth in the hierarchy and the other dimension represents position-in-level.

17. A The method of claim 11 in which the first type of action comprises dragging.

18. The method of claim 11 in which the second type of action comprises clicking and releasing.

19. The method of claim 1, 6, or 11 also comprising displaying a representation of a portion of the hierarchy of nodes, providing a software emulation of a return-to-center input device for enabling a user to navigate the hierarchy, and in response to the user manipulating a non-return-to-center input device to indicate an intended manipulation of the emulation for navigating the hierarchy, treating the user's manipulation as a manipulation of the return-to-center input deice.

20. The method of claim 19 in which the non-return-to-center input device comprises a computer mouse, trackball, or pad.

21. The method of claim 19 in which the return-to-center input device comprises a joystick.

22. The method of claim 19 in which the emulation includes rendering the device on a display.

23. The method of claim 19 in which the response to the user manipulation is to change a focus position in the hierarchy.

24. The method of claim 23 in which the focus position is changed by periodically adding a focus increment vector to a focus position, the focus increment vector being a function of the vector by which the emulated controller is displaced.

25. The method of claim 24 in which the function is nonlinear to permit the user to vary navigation velocity over a wide two-dimensional range.

26. The method of claim 19 in which the user manipulating the non-return-to-center controller in a single dragging action enables the user to view an arbitrarily large hierarchy of nodes.

27. The method of claim 1, 6, or 11 also comprising at a client device, displaying information about a portion of the hierarchy of nodes, the portion changing as a focus position changes, fetching, from a server, as a result of no user interaction other than navigation, information about portions of the hierarchy that are approaching view, including information not previously fetched about descendant nodes of currently displayed nodes, and representing each node as the displayed portion of the hierarchy changes to include the node.

28. The method of claim 1, 6, or 11 also comprising receiving at a server a request from a client for information about the hierarchy, in response to the request, providing to the client information about only a portion but not all of the hierarchy, the portion including references to information about other portions of the hierarchy, and determining the size of the portion to be provided to the client adaptively based on parameters for optimizing communication between the server and the client.

29. The method of claim 28 in which each of the portions comprises a sub-hierarchy of the hierarchy.

30. The method of claim 28 in which the server automatically builds a hierarchy definition portion that is as near as possible in size to a given minimum portion size.

31. The method of claim 28 in which the server generates references to sub-hierarchies and includes them with definitions of nodes of the portion provided.

32. The method of claim 28 in which the server includes hardware or software.

33. The method of claim 28 in wich the server is remote from the client.

34. The method of claim 28 in which the server resides on a different machine, separated by a network, from the machine on which the client resides.

35. The method of claims 1, 6, or 11 in which the nodes comprise links to web pages.

36. The method of claim 1, 6, or 11 in which the hierarchy comprises a hierarchical function menu.

37. The method of claim 1, 6, or 11 in which the hierarchy comprises a hierarchical file system.

38. The method of claim 1, 6, or 11 in which the hierarchy comprises a document encoded in XML or an extension thereof.

39. The method of claim 1, 6, or 11 in which the hierarchy comprises a hierarchical index constructed from a document, list, or table.

40. The method of claim 1, 6, or 11 in which the hierarchy comprises an encoded hierarchy.

41. The method of claim 1, 6, or 11 in which the hierarchy comprises the Dewey Decimal System.

42. The method of claim 1, 6, or 11 in which the hierarchy comprises categorized products.

43. The method of claim 1, 6, or 11 in which the hierarchy comprises postal addresses or other location by geographic region.

44. The method of claim 1, 6, or 11 in which the hierarchy comprises characters belonging to a character set to be selected for text entry.

45. The method of claim 1, 6, or 11 in which the hierarchy comprises a corpus which is not hierarchical in its native form and upon which hierarchy has been imposed using a similarity-seeking technology.

46. The method of claim 1, 6, or 11 also comprising displaying a portion that is less than all of the hierarchy at a browser, enabling a user to navigate continuously through levels and nodes of the hierarchy based on a user's continuous activation of a user interface device, the portion that is displayed changing apparently continuously with the user's continuous activation of the user interface device, and during navigation delivering portions of the hierarchy from a remote server to the browser in time to enable the continuous navigation.

47. A method comprising displaying a representation of a portion of a hierarchy of nodes to a user, enabling a user to vary the portion of the hierarchy displayed and the scale and degree of detail at which any node is represented by a first type of user-interface action performed outside of the displayed representation of the portion of the hierarchy, allowing, by a second type of user-interface action within the displayed representation of the portion of the hierarchy, the selection of any node in the portion of the hierarchy of nodes of which a representation is being displayed, and reporting each selection to an application to invoke node-specific behavior in the application, the node-specific behavior being other than affecting the representation of the hierarchy, and the application being other than the representation and navigation of the hierarchy.

\* \* \* \* \*